Nov. 30, 1937. J. F. COLEMAN 2,100,940
LOUPE
Filed Aug. 8, 1936

Inventor
JOHN F. COLEMAN
By Kimmel & Crowell
Attorneys

Patented Nov. 30, 1937

2,100,940

UNITED STATES PATENT OFFICE 2,100,940

LOUPE

John F. Coleman, Smithboro, N. Y.

Application August 8, 1936, Serial No. 95,007

3 Claims. (Cl. 88—41)

This invention relates to a loupe or eyeglass adapted for use by stamp collectors, jewel appraisers and the like in order to facilitate the inspection or examination of close work.

The primary object of the invention is to provide a loupe of the character aforesaid which is particularly adapted to be mounted in a spectacle frame of shell, zyl or other slightly resilient type, so that the loupe may be worn and supported in the same manner as ordinary spectacles, leaving both hands of the user free for application to the work.

A further object of the invention is to provide a loupe which may be readily attached and detached with respect to a spectacle frame as aforesaid in order that the loupe may be employed interchangeably for the right or left eye without any change in the frame.

A further object of the invention is to provide a loupe for use in connection with a spectacle frame in which the loupe may be substituted for one spectacle lens, and in which an opaque lens may be substituted for the other spectacle lens, or in which the other spectacle lens may be especially treated to make the same opaque in order that light may be excluded from the eye not associated with the loupe to enhance the effectiveness of the eye that is so associated.

A further object of the invention is to provide a loupe of the character aforesaid which is extremely light in weight, and which is of extremely simple and economical construction.

Figure 1:
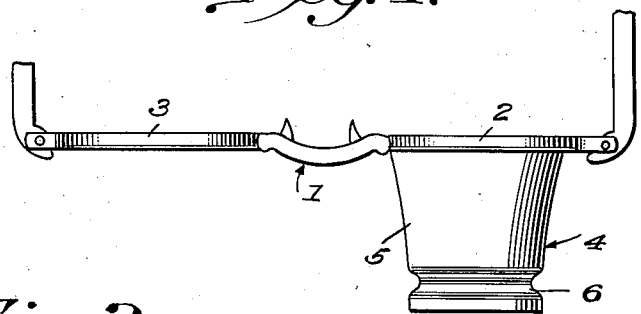
Figure 2:
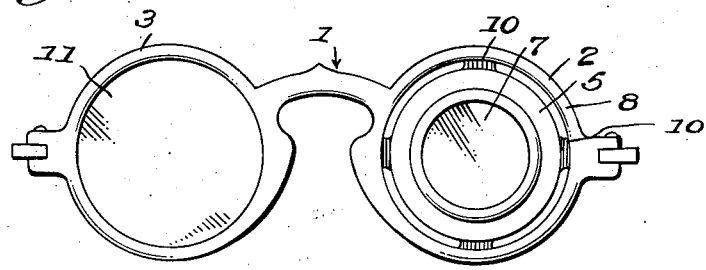
Figure 3:
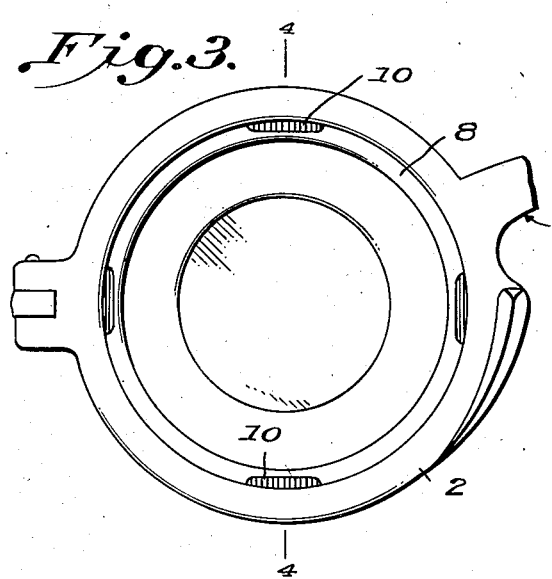
Figure 4:
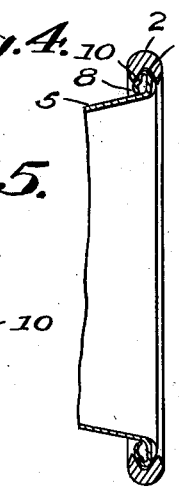
Figure 5:
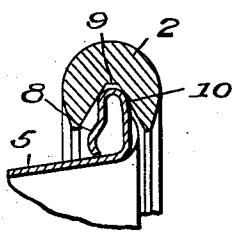
Figure 6:

An embodiment of the invention is illustrated in the accompanying drawing in which:

Figure 1 is a top plan of a spectacle frame showing a loupe in accordance with this invention attached thereto, Figure 2 is a front elevation of the embodiment shown in Figure 1, Figure 3 is an enlarged fragmentary rear elevation showing the loupe attached to the frame, Figure 4 is a section taken on the line 4—4, Figure 3, Figure 5 is an enlarged fragmentary section similar to Figure 4 showing the connection of the loupe with the frame in detail, and Figure 6 is an enlarged fragmentary elevation showing a portion of the loupe.

Referring to the drawing in detail, the numeral 1 indicates generally a spectacle frame preferably formed of shell or zyl, and including lens holders 2 and 3. The loupe is indicated generally at 4 and is adapted for connection with one of the lens holders, for example, the lens holder 2 as shown in the drawing.

The loupe 4 includes a body member 5 of tapered tubular construction which is formed adjacent the smaller end thereof with suitable means 6 for retaining a loupe lens 7 therein. The opposite or large end of the body 5 is rolled or otherwise formed into a bead 8 adapted to be received within a groove 9 formed in the inner circumferential face of the lens holder 2. At spaced points circumferentially thereof, the bead 8 is provided with flat lugs 10 which preferably are formed by pinching together the side faces of the bead adjacent the periphery thereof.

In assembling the loupe with respect to the spectacle frame, the loupe is positioned with one or more of the lugs 10 within the groove 9, and the lens holder 2 is sprung sufficiently to enable the remaining lugs 10 to enter the groove 9 whereby the loupe is held in position with respect to the frame. Preferably the lens 11 carried by the lens holder 3 will be opaque, either so formed or treated in a manner to make the same so, for preventing any light from passing through this lens to the eye of the user associated therewith. By so excluding the light, substantially the same effectiveness of the eye associated with the loupe will be had as would be the case if the eye associated with the lens 11 were closed.

It will be readily seen that the loupe 4 may be attached to either lens holder of a spectacle frame, in accordance with the desires of the user, and that when the spectacle frame is worn with the loupe attached thereto, the loupe will be firmly held in position, leaving both hands of the user entirely free for handling or manipulating the object being examined or inspected.

While the embodiment of the invention herein illustrated and described is to be considered as a practical and preferred embodiment of the same, it is to be understood that such changes in the details of construction may be resorted to that fall within the scope of the invention as defined in the appended claims.

What I claim is:—

1. A spectacle frame including a resilient annular lens holder formed in its inner circumferential face with a groove, a loupe lens, a tapered tubular body formed with means adjacent its smallest end for supporting said lens therein, said body being formed at the largest end thereof with an annular peripheral bead, and said bead being formed with radially disposed spaced inherent parts constituting attaching lugs coacting with the walls of said groove for detachably securing the largest end of said body within and to the lens holder.

2. A spectacle frame including a resilient lens holder formed on its inner face with a groove, a loupe lens, a tubular body having means adjacent one end for supporting said lens, an annular peripheral bead at the other end of said body, and said bead having spaced portions thereof extending radially therefrom and into said groove and coacting with the walls of the latter for connecting said body to the lens holder.

3. A spectacle frame including a pair of resilient lens holders, an opaque spectacle lens adapted to be secured within one of said lens holders, the other of said lens holders having its inner face formed with a groove, a hollow body for supporting a loupe lens, said body being formed at one end with an annular peripheral bead arranged within the said grooved lens holder, said bead being formed with spaced radially disposed extended portions coacting with the walls of said groove for detachably connecting said body to said frame.

JOHN F. COLEMAN.